(12) United States Patent
Dooley et al.

(10) Patent No.: US 7,705,508 B2
(45) Date of Patent: Apr. 27, 2010

(54) COOLED CONDUCTOR COIL FOR AN ELECTRIC MACHINE AND METHOD

(75) Inventors: Kevin Allan Dooley, Mississauga (CA); Joshua D. Bell, Toronto (CA)

(73) Assignee: Pratt & Whitney Canada Crop., Longueuil, Quebec (CA)

( * ) Notice: Subject to any disclaimer, the term of this patent is extended or adjusted under 35 U.S.C. 154(b) by 781 days.

(21) Appl. No.: 11/382,578

(22) Filed: May 10, 2006

(65) Prior Publication Data

US 2007/0262662 A1    Nov. 15, 2007

(51) Int. Cl.
*H02K 3/04* (2006.01)
(52) U.S. Cl. .......................................... 310/208; 310/65
(58) Field of Classification Search ......... 310/201–208, 310/52–65, 196
See application file for complete search history.

(56) References Cited

U.S. PATENT DOCUMENTS

| | | | |
|---|---|---|---|
| 2,821,641 A | * | 1/1958 | Ringland .................... 310/213 |
| 3,846,651 A | * | 11/1974 | Mishra ......................... 310/61 |
| 4,070,593 A | | 1/1978 | Von Musil et al. |
| 4,149,100 A | | 4/1979 | Spirk |
| 4,484,097 A | | 11/1984 | Kanayama et al. |
| 5,331,244 A | * | 7/1994 | Rabe ........................... 310/180 |
| 5,723,933 A | * | 3/1998 | Grundl et al. ............... 310/266 |
| 5,866,965 A | | 2/1999 | Baronosky et al. |
| 6,011,339 A | * | 1/2000 | Kawakami ................... 310/208 |
| 6,879,069 B1 | * | 4/2005 | Weidman et al. .............. 310/61 |

FOREIGN PATENT DOCUMENTS

| | | |
|---|---|---|
| JP | 09035955 A | 2/1997 |
| JP | 09046992 A | 2/1997 |
| JP | 2004343877 A | 12/2004 |

* cited by examiner

*Primary Examiner*—Dang D Le
(74) *Attorney, Agent, or Firm*—Ogilvy Renault LLP

(57) ABSTRACT

The invention includes an electric machine having a rotor, a stator and at least one electrical coil disposed in the machine and a source of coolant fluid in communication with the coil. The coil has concentric turns having spaces therebetween adapted to channel coolant flow between the concentric turns.

16 Claims, 2 Drawing Sheets

COOLED CONDUCTOR COIL FOR AN ELECTRIC MACHINE AND METHOD

TECHNICAL FIELD

The invention relates to electric machines and in particular to the cooling of conductor coils.

BACKGROUND

Electric machines are generally provided with at least one coil or winding. These coils are usually formed by one or more insulated conductors having many concentric turns. Depending on the design of the machine, the coil or coils must be cooled so as to keep their operating temperature within a desired range. However, the coils are usually cooled by air, oil or other coolant circulating over the exterior turns thereof. The turns of the coils that are inside may not contact the coolant as well, and may only be cooled through heat conduction with the turns closer to the effective heat transfer surface(s). Also, the shape of the coil conductors is typically optimized for electrical performance, which may not necessarily result in good heat transfer properties. It would therefore be desirable to improve the cooling of coils.

SUMMARY

In one aspect, the present invention provides an electric machine having a rotor, a stator and at least one coolant inlet, at least one electrical coil disposed in the machine and a source of coolant fluid in communication with the coil, the coil comprising a flat conductor coiled in a plurality of substantially concentric turns around a portion of the machine, the concentric turns having spaces therebetween adapted to channel a coolant flow received from the coolant inlet between the concentric turns.

In another aspect, the invention provides a conductor coil for use in an electric machine having a rotor, a stator and a coolant fluid circuit, the conductor coil comprising a flat conductor coiled in a plurality of substantially concentric turns, the concentric turns having spaces therebetween forming a portion of the coolant fluid circuit.

In another aspect, the invention provides a method of cooling a machine coil comprising the steps of: providing a coil made at least in part of a flat conductor having a plurality of turns spaced apart from each other; and directing a coolant fluid between adjacent turns of the coils to remove heat from the coil.

BRIEF DESCRIPTION OF THE FIGURES

For a better understanding and to show more clearly how it may be carried into effect, reference will now be made by way of example to the accompanying figures, in which.

DETAILED DESCRIPTION

Figure 1:
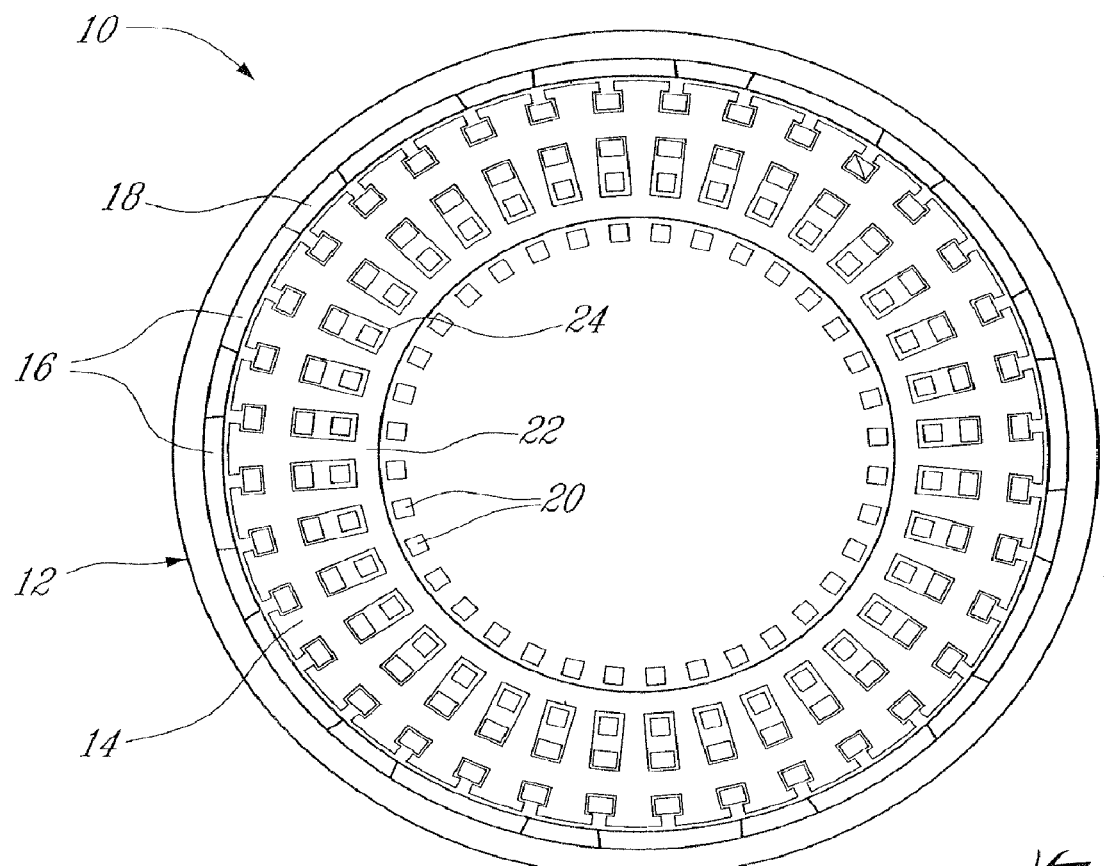
FIG. 1 is a schematic cross-sectional view of an example of an electric machine employing the invention.

FIG. 1 shows an example of an electrical machine 10. It should be noted that the present invention is not limited to the particular design of this electrical machine. FIG. 1 is only provided as an example. Also, FIG. 1 is schematic in nature, and many routine details of the design have been omitted for clarity.

The electrical machine 10 comprises a rotor 12 and a stator 14. The rotor 12 is set around the stator 14 and comprises permanent magnets 16 interposed between yokes 18. In the illustrated electrical machine 10 as shown better in FIG. 2, a plurality of conductor coils 20, preferably having an oblong shape, are provided around a back iron 22 at the center of the stator 14. A portion of the conductor coils 20 extend in slots 24 provided in the stator 14.

Preferably, heat is removed from the conductor coil 20 using a coolant fluid (not shown), for instance air or oil. Any suitable means for providing coolant to the coil 20, and removing spent coolant from coil 20 may be employed, and thus are not discussed further here.

To improve the heat transfer with the coolant, each conductor coil 20 has a shape and arrangement which enhances heat transfer with the coolant such as, in this embodiment, a flat conductor (preferably electrically insulated between turns) that is shaped in concentric turns with a gap between each adjacent turn. The interspace formed by these gaps is then used to circulate the coolant fluid within the coil itself. Also, because the conductor is in the form of a flat strip, the coolant fluid has an improved heat transfer with the conductor since the conductor's surface area is larger than with a comparably-sized round or square wire, for instance.

As will be appreciated, the flat conductor preferably has a cross-section with good heat transfer properties—that is, extensive surface area relative to cross-sectional area. Preferably, the conductor will have a width face which is at least 2 times greater than its thickness face, and more preferably 4 to 5 times greater, and still more preferably at least 10 times greater. Also, preferably, the conductor will have a perimeter/circumference to cross-sectional area relationship much greater than 2:1, and more preferably 5:1 or greater.

Figure 2:
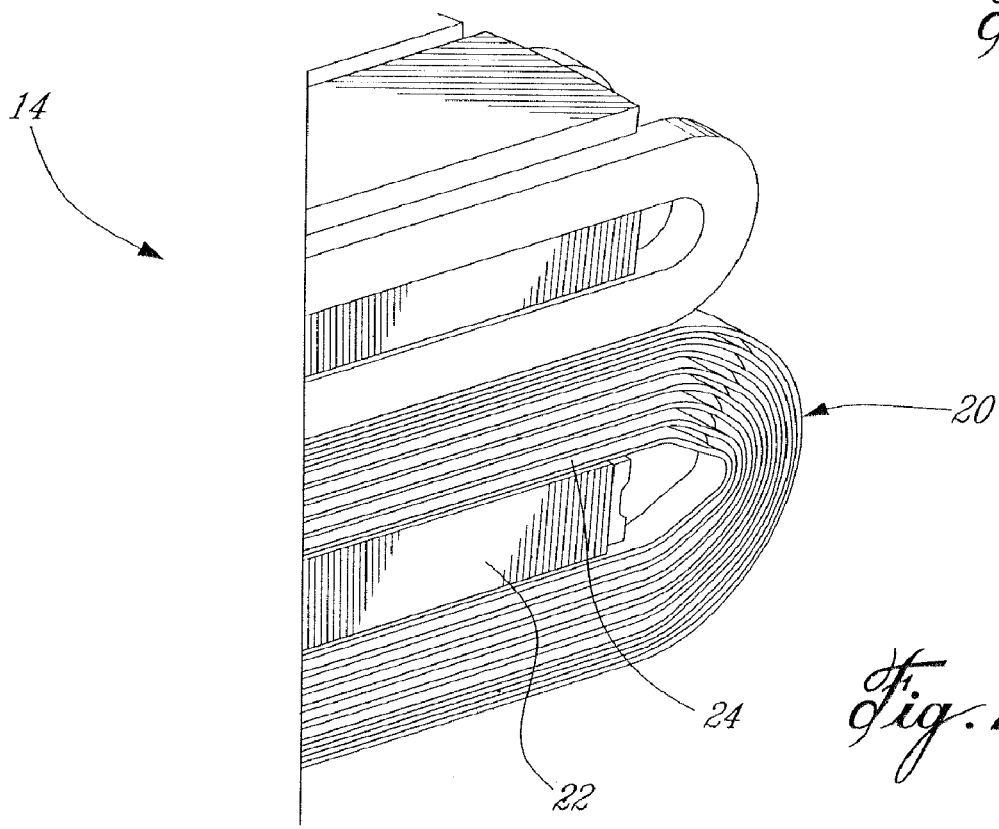
FIG. 2 is an isometric partial cross-sectional view of a portion of the stator of FIG. 1, showing a conductor coil according to the present invention.
Figure 4:
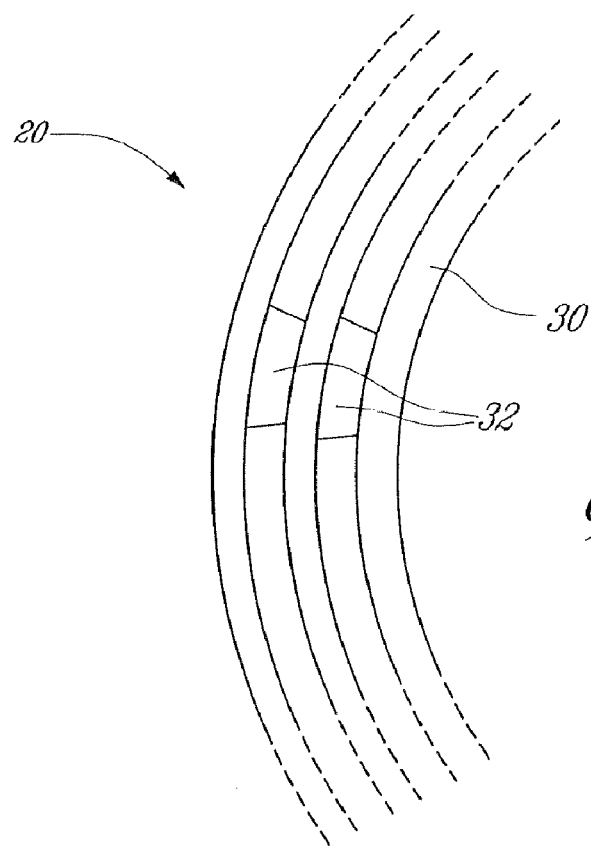
FIG. 4 is a side view of the conductor coil of FIG. 2, shown with spacers.

It should be noted that the width of the interspace has been exaggerated in FIG. 2 for the purpose of illustration. To achieve the desired gap between wires, during manufacture, when the conductor 30 is shaped and curved into the coil 20 (either by hand or with the use of a machine, as desired), the gap between each turn is provided by a thin spacer 32 (see FIG. 4), for instance a suitable paper or plastic spacer. A typical gap would be about 0.01", which is enough for the coolant fluid such as oil to circulate into the coil. Once each turn or all turns are formed, the spacer or spacers 32 are preferably removed.

The flat conductor 30 can be made of copper or any other suitable conductive material. A super conductive material can also be used. The exterior of the conductor 30 preferably has a layer of electrically insulating varnish or sheathing.

Figure 3:
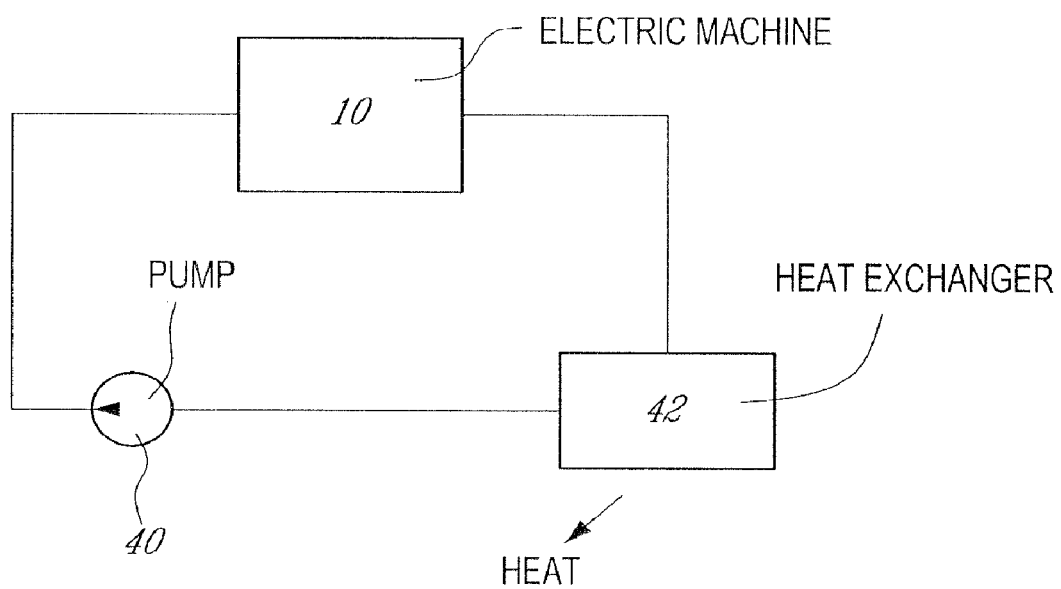
FIG. 3 is block diagram showing an example of a cooling system for the machine of FIG. 1.

In use, a fluid is sent to the coils to provide cooling. FIG. 3 shows an example of a system using a liquid, such as oil, as a heat transfer medium. The oil is provided inside the electrical machine 10 using a pump 40. The oil is directed to an internal housing (not shown) preferably to both sides of the stator 14, where it flows around and within the conductor coils 20, and notably through the gaps provided at the end turns, and then exits the electrical machine 10 with added heat from the cooled coils. The oil is later cooled in a heat exchanger 42 to remove excess heat, before completing the coolant circuit.

If desired, the spacers 32 can be permanently provided between turns of the conductor 30 to maintain the spacing between them.

The above description is meant to be exemplary only, and one skilled in the art will recognize that other changes may also be made to the embodiments described without departing from the scope of the invention disclosed as defined by the appended claims. For example, the electrical machine in which the present invention is used can be different from what is shown in FIG. 1, and any suitable machine type may be employed. The conductors need not be flat, per se, but rather any suitable cross-sectional shape may be employed to improve heat transfer. The machine coils may be in the rotor or stator of the machine. The spacers used during the manufacturing of the turns are not necessarily made of paper or plastic, and any suitable spacing technique may be used, such as integrating a spacer or stand-off into the conductor shape itself, such as by bending of kinking the conductor, for example, or by provided a spacer feature into the conductor cross-section. Spacers may be removed (if removal is desired) using any suitable process. During or at the end of the manufacturing process, the spacers are not necessarily pulled out of their position. They can be chemically dissolved, burned or melted. The coolant fluid is not limited to air or oil, and can be any suitable fluid, depending on the design. The coolant circuit of FIG. 3 is exemplary only, and may vary depending on design. For example, if air is used as a cooling medium, it may be exhausted into the atmosphere, instead of going into a heat exchanger. Furthermore, the skilled reader will appreciate that the present approach permits an "equivalent" conductor having better cooling characteristics to be provided, such as replacing a single turn thicker copper bar conductor, with a plurality of thinner (and in this case) uninsinuated turns which, collectively, provide the same electrical coil properties of the thicker bar, but offer vastly improved cooling surfaces for heat transfer. For example, to form a conductor which is, say, five times the cross section of a single flat conductor, such that five times the current can be passed through the conductor at the same current density, five turns of electrically uninsinuated flat conductor is provided, with spacing between the end turns, such that cooling fluid will be exposed to each of the surfaces of each layer. This results in cooling surface area of five times what would exist if the conductor were constructed from a single solid rectangular component. Still other variations and modifications will be apparent to the skilled reader in light of the present disclosure, and such variations and modifications are not intended to be excluded from the scope of the appended claims simply because all variants and modifications have not been exhaustively described herein.

What is claimed is:

1. An electric machine having a rotor, a stator and at least one coolant inlet, at least one electrical coil disposed in the machine and a source of coolant fluid in communication with the coil, the coil disposed partially within each of a plurality of slots of the stator and comprising one or more flat conductors coiled in a plurality of substantially concentric turns around a portion of the machine; each pair of the plurality of concentric turn having a space therebetween adapted to channel a coolant flow received from the coolant inlet between the concentric turns and protruding partially from the slot within which the pair is partially disposed.

2. The electric machine as defined in claim 1, wherein the space is between the end portions of adjacent turns.

3. The electric machine as defined in claim 1, wherein the conductor has a width face and a thickness face, the width face being larger than the thickness face, the space being disposed between adjacent width faces of the coil.

4. The electric machine as defined in claim 1, wherein the flat conductor has a width to thickness ratio of at least 2:1.

5. The electric machine as defined in claim 1, wherein the flat conductor has a width to thickness ratio of at least 5:1.

6. The electric machine as defined in claim 1, wherein the flat conductor has a width to thickness ratio of at least 10:1.

7. The electric machine as defined in claim 1, wherein the space is provided by a spacer between adjacent turns.

8. The electric machine as defined in claim 1, wherein the conductors are electrically insulated between adjacent turns.

9. The electric machine as defined in claim 1, wherein the conductors are electrically uninsulated between adjacent turns.

10. A conductor coil for use in an electric machine having a rotor, a stator and a coolant fluid circuit, the conductor coil comprising a flat conductor coiled in a plurality of substantially concentric turns, each pair of the plurality of concentric turns having a space therebetween and communicating with the coolant fluid circuit, the conductor coil being adapted to be disposed partially within, and to protrude partially from, a slot of the stator.

11. The conductor coil as defined in claim 10, wherein the conductor coil has an oblong shape, the space being at least between the end portions of adjacent turns.

12. The conductor coil as defined in claim 10, wherein the flat conductor has a width face and a thickness face, the width face being larger than the thickness face, the space being disposed between adjacent width faces of the coil.

13. The conductor coil as defined in claim 10, wherein the flat conductor has a width to thickness ratio of at least 2:1.

14. The conductor coil as defined in claim 10, wherein the flat conductor has a width to thickness ratio of at least 5:1.

15. The conductor coil as defined in claim 10, wherein the flat conductor has a width to thickness ratio of at least 10:1.

16. The conductor coil as defined in claim 10, wherein the space is provided by a spacer between adjacent turns.

* * * * *